(12) United States Patent
Fischer et al.

(10) Patent No.: US 9,661,401 B2
(45) Date of Patent: *May 23, 2017

(54) LOCATING A BACKSCATTER-BASED TRANSPONDER

(71) Applicant: Atmel Corporation, San Jose, CA (US)

(72) Inventors: Martin Fischer, Pfedelbach (DE); Ulrich Friedrich, Ellhofen (DE); Jens Masuch, Mannheim (DE); Michael Pangels, Ludwigsburg (DE); Dirk Ziebertz, Eberstadt (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,219

(22) Filed: Feb. 3, 2014

(65) Prior Publication Data

US 2014/0145830 A1 May 29, 2014

Related U.S. Application Data

(63) Continuation of application No. 13/049,649, filed on Mar. 16, 2011, now Pat. No. 8,643,472, which is a
(Continued)

(30) Foreign Application Priority Data

Dec. 13, 2004  (DE) .......................... 10 2004 062 365
Dec. 6, 2005   (DE) .......................... 10 2005 059 507

(51) Int. Cl.
*H04Q 5/22*    (2006.01)
*G06K 7/00*    (2006.01)
*G06K 19/07*   (2006.01)

(52) U.S. Cl.
CPC ............. *H04Q 5/22* (2013.01); *G06K 7/0008* (2013.01); *G06K 19/0723* (2013.01)

(58) Field of Classification Search
CPC ............................ G06K 7/0008; G08C 17/02
(Continued)

(56) References Cited

U.S. PATENT DOCUMENTS

| 5,214,410 A | 5/1993 | Verster |
| 5,245,346 A | 9/1993 | Nishimura et al. |

(Continued)

FOREIGN PATENT DOCUMENTS

| DE | 103 25 396 A1 | 12/2004 |
| DE | 103 49 647 A1 | 6/2005 |
| EP | 1 482 647 A2 | 12/2004 |

OTHER PUBLICATIONS

Klaus Finkenzeller, "RFID Handbook," 2"0 Edition, John Wiley & Sons Ltd., Chapters 3.2.1.2.1, 3.2.1.2.2; 4.2.5.4,5.1.7,5.1.8,5.1.9; 6.2.1; 7.2; ISBN 0-470-84402-7, 2003.
(Continued)

*Primary Examiner* — Vernal Brown
(74) *Attorney, Agent, or Firm* — Fish & Richardson P.C.

(57) ABSTRACT

A method and apparatus for locating a transponder is provided. A carrier signal is transmitted by a base station and a transponder transmits a locating signal that is generated through phase modulation and backscattering of the carrier signal sent by the base station when the transponder is within a transmission range of the base station, whereby the transponder is located on the basis of the locating signal.

24 Claims, 2 Drawing Sheets

Related U.S. Application Data continuation of application No. 11/299,801, filed on Dec. 13, 2005, now abandoned.

(58) Field of Classification Search
USPC .......................................................... 340/10.1
See application file for complete search history.

(56) References Cited

U.S. PATENT DOCUMENTS

| | | | |
|---|---|---|---|
| 5,307,349 | A | 4/1994 | Shloss |
| 5,557,280 | A * | 9/1996 | Marsh .................... G01S 13/78 342/44 |
| 5,929,779 | A | 7/1999 | MacLellan et al. |
| 6,046,676 | A | 4/2000 | Ward et al. |
| 6,046,683 | A | 4/2000 | Pidwerbetsky |
| 6,412,086 | B1 | 6/2002 | Friedman et al. |
| 6,838,989 | B1 | 1/2005 | Mays |
| 7,256,739 | B2 | 8/2007 | Usami |
| 7,796,016 | B2 | 9/2010 | Fukuda |
| 8,643,472 | B2 | 2/2014 | Fischer et al. |
| 2003/0164752 | A1 | 9/2003 | Haimovitch |
| 2004/0257220 | A1 | 12/2004 | Fischer |
| 2004/0257293 | A1 | 12/2004 | Freidrich |
| 2005/0083178 | A1 | 4/2005 | Friedrich |
| 2006/0125605 | A1 | 6/2006 | Fischer et al. |
| 2011/0163851 | A1 | 7/2011 | Fischer et al. |

OTHER PUBLICATIONS

U.S. Appl. No. 61/454,894, filed Mar. 2011, Rothkopf.
U.S. Appl. No. 61/454,936, filed Mar. 2011, Myers.
U.S. Appl. No. 61/454,950, filed Mar. 2011, Lynch.
M. Fischer, U.S. Appl. No. 13/049,649, Issue Notification, Jan. 15, 2014.
M. Fischer, U.S. Appl. No. 13/049,649, Notice of Allowance and Fees, Nov. 8, 2013.
M. Fischer, U.S. Appl. No. 13/049,649, RCE and Amendment, Oct. 15, 2013.
M. Fischer, U.S. Appl. No. 13/049,649, Final Rejection, Jun. 14, 2013.
M. Fischer, U.S. Appl. No. 13/049,649, Amendment, Apr. 15, 2013.
M. Fischer, U.S. Appl. No. 13/049,649, Non-Final Rejection, Nov. 14, 2012.
M. Fischer, U.S. Appl. No. 13/049,649, RCE and Amendment, Jul. 5, 2012.
M. Fischer, U.S. Appl. No. 13/049,649, Final Rejection, Apr. 5, 2012.
M. Fischer, U.S. Appl. No. 13/049,649, Amendment, Jan. 17, 2012.
M. Fischer, U.S. Appl. No. 13/049,649, Non-Final Rejection, Sep. 14, 2011.
M. Fischer, U.S. Appl. No. 13/049,649, Preliminary Amendment, Mar. 16, 2011.
M. Fischer, U.S. Appl. No. 11/299,801, Preliminary Amendment, Mar. 17, 2006.
M. Fischer, U.S. Appl. No. 11/299,801, Non-final Rejection, Oct. 30, 2008.
M. Fischer, U.S. Appl. No. 11/299,801, Amendment, Mar. 30, 2009.
M. Fischer, U.S. Appl. No. 11/299,801, Non-final Rejection, Jun. 15, 2009.
M. Fischer, U.S. Appl. No. 11/299,801, Amendment, Jul. 28, 2009.
M. Fischer, U.S. Appl. No. 11/299,801, Final Rejection, Nov. 20, 2009.
M. Fischer, U.S. Appl. No. 11/299,801, Response, Feb. 12, 2010.
M. Fischer, U.S. Appl. No. 11/299,801, Advisory Action, Mar. 9, 2010.
M. Fischer, U.S. Appl. No. 11/299,801, Notice of Appeal, Mar. 22, 2010.
M. Fischer, U.S. Appl. No. 11/299,801, Appeal Brief, Aug. 9, 2010.
M. Fischer, U.S. Appl. No. 11/299,801, Examiner's Answer, Oct. 27, 2010.
M. Fischer, U.S. Appl. No. 11/299,801, Reply Brief, Dec. 27, 2010.
M. Fischer, U.S. Appl. No. 11/299,801, Abandonment, Mar. 30, 2011.

* cited by examiner

LOCATING A BACKSCATTER-BASED TRANSPONDER

PRIORITY CLAIM

This application is a continuation under 35 U.S.C. §120 of U.S. patent application Ser. No. 13/049,649, filed Mar. 16, 2011, which is a continuation under 35 U.S.C. §120 of U.S. patent application Ser. No. 11/299,801, filed Dec. 13, 2005, now abandoned, which claims the benefit, under 35 U.S.C. §119(a) of German Patent Application No. 102004062365.1, filed Dec. 13, 2004 and German Patent Application No. 102005059507.3, filed Dec. 6, 2005, all of which are incorporated herein by reference in their entirety.

BACKGROUND OF THE INVENTION

1. Field of the Invention

The present invention relates to a method for locating a backscatter-based transponder.

2. Description of the Background Art

Transponders are used in radio frequency identification (RFID) systems. In these systems, unidirectional or bidirectional wireless transmission of data takes place between one or more base stations, or readers, and one or more transponders. Sensors, for example for temperature measurement, may also be integrated in the transponders. Such transponders are also referred to as remote sensors.

The transponders and their transmitting and receiving devices customarily do not have an active transmitter for data transmission to the base station. Such non-active systems are called passive systems if they do not have their own energy supply, and semi-passive systems if they have their own energy supply. Passive transponders take the energy they require for their supply, or operating power, from the electromagnetic field emitted by the base station.

In general, a so-called backscatter coupling is used to transmit data from a transponder to the base station using UHF or microwaves in the far field of the base station. To this end, the base station emits electromagnetic carrier waves, or a carrier signal, which the transmitting and receiving device in the transponder modulates and reflects appropriately for the data to be transmitted to the base station using a modulation method, in particular a subcarrier modulation method. A typical modulation method for this purpose are amplitude modulation or amplitude shift keying as described in Klaus Finkenzeller, RFID-Handbuch, 3rd edition, HANSER, 2002, see especially Chapter 6.2.1 Amplitude shift keying, which has been published in English by John Wiley & Sons, and as described in U.S. Pat. No. 6,046,683. Alternatively, a phase modulation can be used.

The commonly used data transmission protocols differentiate between so-called "reader-talks-first" (RTF) protocols and "tag-talks-first" (TTF) protocols. With the TTF protocol, the base station transmits an unmodulated carrier signal. When a transponder enters the communicating zone of the base station, that is, when it can detect the unmodulated carrier signal emitted by the base station, it automatically, that is, on its own transmits a signal, which can be received by the base station. The signal transmitted by the transponder can have a transponder identification, for example. In contrast thereto, with the RTF protocol, a data transmission from the transponder to the base station is initiated by sending an order, that is, a command, from the base station to the transponder, that is, the transponder does not transmit a signal and/or information automatically or on its own. To send a command, it is common for the command to be coded by the base station and the coded signal to be transmitted by modulation of the carrier signal.

With unidirectional RFID systems, information is merely transmitted from the transponder to the reader, that is, the TTF protocol is commonly used here. With bidirectional RFID systems, the information is transmitted between the transponder and the reader in both directions. Both TTF and RTF systems are used here.

In so-called pick-and-place applications, an object to be placed is taken out of a package by a gripper, for example, and then placed in a specific location, for example on a printed circuit board. If the original location of the object to be placed is unknown, such as is the case for pallets that as part of a logistics chain are set down in spots that are not precisely determined in advance, the objects to be placed must be located spatially in a first step of the pick-and-place application.

When objects such as pallets or the individual packaging units of a pallet are provided with transponders for identification, the transponder can be used for both identifying and locating the goods. In this context, identification is typically accomplished by entering a goods identifier in a memory area of the transponder. The process of spatial location can take place using a locating signal transmitted by the transponder. In this context, a robot can use the locating signal as a guide beam. A method for locating is described in U.S. Pat. No. 6,046,683.

In U.S. Pat. No. 6,046,683, the transmission of the locating signal is initiated by the base station on the basis of the RTF protocol by contacting, that is, isolating or singling out an initially unknown transponder from a plurality of transponders, in order to enable, directly or indirectly, the transponder to transmit the locating signal. In other words, the base station must continuously send information queries in order to detect transponders that are newly entering the communicating zone. This so-called polling causes an interference spectrum.

If, in addition to the locating function, that is, with an active locating signal, the transponder is to be able to receive data, the duration of the locating signal must be time-limited with transponder systems that feature amplitude modulation of the backscattered signal, or else the locating signal sent by the transponder must be interrupted, or suppressed, at certain time intervals to enable the transponder to receive data.

This is based on that data transmission from the base station to a transponder is customarily accomplished with the use of amplitude modulation of the carrier signal transmitted by the base station in the form of sequential field gaps or field attenuations of the carrier signal, which are also called notches. Such notches are detected in the transponder by means of receiver signal strength indicator (RSSI) circuits.

When the transponder's locating signal is generated through amplitude modulation and backscattering of the carrier signal by the transponder, the real part of an input impedance of the transponder is changed, see Finkenzeller, chapter 4.2.5.4, effective aperture and scatter aperture. The change in the real part of the input impedance leads to a matching or mismatch of the transponder's input impedance to an impedance of a transponder antenna, which changes the reflection properties and receiving properties of the transponder antenna, with the result that the transponder or its antenna reflects or receives more or less power. In this context, the modulation index is customarily relatively large in order to achieve correspondingly high field strength differences between an absorption state, that is an adapted state, and a reflector state, that is an error adapted state, that is to effect comparatively large signal-to-noise ratios of the backscattered signal.

The transponder's received level strongly decreases as the distance increases between the base station and the transponder so that, in contrast to 125 kHz RFID systems, the received level in the transponder must be amplified. Thereby, the self caused fluctuations of the input amplitude of the received carrier signal that are caused by the transponder itself, an that arise during the generation of the locating signal through amplitude modulation and backscattering of the received carrier signal, can only be distinguished with great effort from the notch signals generated by the base station, which likewise result in a change in the amplitude of the received carrier signal. This is especially the case when the field attenuation for notch generation (modulation index) is kept small in order to increase the range. Additional complex input filters are then required in the transponder in order to differentiate. In order to achieve differentiation by means of filters, the sidebands of the received and backscattered signals must additionally be relatively widely separated. This is often impossible to achieve, since applicable standards and/or regulations would otherwise be violated.

In summary, this means, as described in detail above, a communication between transponder and base station can take place due to the amplitude modulation of the transponder, which means that the transponder is unable to receive modulation signals from the base station while the locating signal is being sent. Consequently, the duration of the locating signal has to be time-limited, or else the locating signal emitted by the transponder must be interrupted, or suppressed, at certain time intervals to enable the transponder to receive data.

However, certain applications require transponders, which generate a locating signal that is continuous and not time-limited, and which simultaneously can be polled by a base station, for example, to inquire about their identification, or to program them, once they have been recognized by the base station by virtue of the locating signal transmitted by the transponders.

In the locating method described in U.S. Pat. No. 6,046,683, the transmission of the locating signal by the base station is initiated by an appropriate polling command sent by the base station to the transponder. Because the method described in U.S. Pat. No. 6,046,683 is based on the RTF protocol, in order to detect whether or not a transponder is within their polling range, the base station must continuously send polling commands in order to get a response from transponders that are newly entering their polling zones. However, such a permanent transmission of information by the base station generates an interference spectrum, which is frequently undesirable. Furthermore, the polling command has to be sent at a high frequency so that a transponder newly entering the communication range of the base station can be detected with little delay.

SUMMARY OF THE INVENTION

It is therefore an object of the present invention to provide a simple and economical method for locating backscatter-based transponders with a comparatively small interference spectrum and a short detection time, in which the transponders transmit a locating signal and in which it is possible for the transponders to receive data while they are continuously transmitting the locating signal.

According to the invention, the base station initially transmits an unmodulated carrier signal without sending, by modulation of the carrier signal, a polling command to transponders that are possibly present in its range of communication. When the transponder enters the range of communication of the base station, the latter sends a locating signal, which is generated by phase modulation and backscattering of the carrier signal emitted by the base station. The transponder is located by the locating signal.

Because the base station does not transmit polling commands, the interference spectrum resulting therefrom can be avoided. Because the transponder promptly sends a locating signal as soon as it enters the communication zone, that is, the range of the base station, the transponder can be detected by the base station virtually without delay. In this instance, the transmission of a polling command and an identification of the transponder by the base station as in U.S. Pat. No. 6,046,683 is not absolutely necessary, since merely the presence of the transponder in the communication zone of the base station has to be detected.

On account of the phase modulation, the amplitude of the backscattered signal, or the signal received by the transponder, remains essentially constant so that no notches are detected due to the transponder generating the locating signal in its RSSI circuit. Not until the base station actually generates notch signals for the purpose of data transmission are these notches detected in the transponder, even though the transponder may be sending a locating signal at the same time. In this way, a transponder may be written to or programmed, for example, after a conclusion of the locating process. A circuit arrangement and a method for generating a phase modulation are described in, for example, German patent application 10325396.3, which corresponds to U.S. Publication No. 2004257220, the contents of which are herein incorporated by reference.

In a further embodiment, the base station transmits at least one command, or order, to the transponder while the transponders transmits a locating signal. The command can be a write, read, and/or programming command, for example. Thus, the benefits of the TTF protocol and the RTF protocol can be combined.

In a further embodiment, the transponder is a passive transponder and sends the locating signal when, that is, as soon as the carrier signal for supplying the transponders with operating power is sufficient. In this way, the sending of the locating signal is automatically controlled depending on field strength.

In yet a further embodiment, a selection procedure is carried out by the base station, whereby the transponder to be located is selected from a plurality of transponders when more than one transponders sends a locating signal. Basically, it is thereby differentiated between stochastic and deterministic selection methods. A detailed description of both the deterministic and the stochastic selection method can be found in the book by Klaus Finkenzeller, RFID Handbook, 3rd Edition, HANSER, 2002, particularly Chapter 7.2, Multi-Access Procedures. By analyzing the received signal, particularly the time range, the base station can determine if one or more transponders are sending locating signals simultaneously, since their signals can be superimposed. Compared to an instance, whereby only one transponder sends a locating signal, the behavior of the incoming signal at the base station is different. For example, the reception of a selection command by the respective transponders, which initiates the beginning of the selection procedure may terminate the generation of the respective locating signals in the transponders. After a successful selection process, the base station can send an explicit locating command to the selected transponders. After receiving the locating command, the corresponding transponder generates its locating signal one again so that the selected transponder can be located. Once the locating has been done, a further command can be sent to the selected transponder to turn off its locating signal, for example. Subsequently, and further selection procedure can be executed under exclusion of the previously selected transponder, whereby further transponders can be located.

In a further embodiment, the selection method can be an ALOHA method, in particular a slotted ALOHA method. The ALOHA method is a transponder-controlled, stochastic method in which the transponders transmit their data for transmission with a time offset. As a rule, the time offset is set on the basis of a random number generated in the transponder. If multiple transponders transmit an identification within the same time slot, a collision occurs. This generally prevents the base station from being able to receive the transmitted data error-free. In the slotted ALOHA method, the probability of collision is significantly reduced as compared to the plain ALOHA method. It is a base-station controlled, stochastic method in which the transponders are active, i.e. begin transmission of data, only at defined, synchronous points in time. To this end, the base station prescribes numbered time slots, or slots, and the transponders each generate a random number, with every transponder whose random number corresponds to the number of a time slot transmitting data or an identification to the base station in this time slot. To initiate the selection process, the base station generally transmits a command to the transponders that indicates the start of a selection procedure. After reception of the command, the transponders store the applicable random numbers, which for example were previously calculated in the transponder. When only one transponder transmits an identification within a time slot, this transponder is selected within the time slot, or can be selected by the base station by transmission of an acknowledgement command.

In a further embodiment of the invention, the selection process can be a deterministic process, in particular a binary process, which is also known as a tree-walking mechanism or binary tree search. Mixed stochastic/deterministic methods are also possible. Such a mixed method is described, for example, in German patent application 10349647.5, which corresponds to U.S. Publication No. 2005083178, the contents of which are herein incorporated by reference.

In a further embodiment, the locating signal can be generated by modulating the carrier signal transmitted from the base station with a subcarrier. The modulation of the carrier signal with a subcarrier is described, for example, in the textbook by Klaus Finkenzeller, RFID-Handbuch, $3^{rd}$ edition, HANSER, 2002, see especially Chapter 3.2.1.2.2, (load modulation with subcarriers). Modulation of the carrier signal with a subcarrier permits simplified evaluation of the backscattered signal in the base station, since the backscattered signal, which is significantly weaker in comparison to the carrier signal, is shifted in the frequency range into sidebands, and thus can be separated from the carrier signal in the base station by appropriate filters.

In a further embodiment of the invention, a memory internal to the transponder can contain one or more parameters for setting the locating signal, in particular a frequency. The parameters can also be transferred to the transponder through a command, for example, in the form of command parameters. In the case that a selection process is needed, the parameter locating command can be the locating command.

This makes it possible, for example, to keep the spectra produced by the locating signal or signals from colliding with the spectra of other RFID applications. When the locating signal is set with the aid of the locating command, the base station can dynamically set the spectrum of the locating signal as a function of the ambient conditions encountered. In an advantageous embodiment, the parameter or parameters are used to set a frequency and/or a duty cycle of a modulation signal with which the carrier signal is modulated. In this way, almost any desired spectra of the locating signal can be set. The frequency and/or the duty cycle can be derived from an oscillator clock internal to the transponder. To this end, for example, a counter can be driven by the oscillator clock internal to the transponder, with a modulation state being switched when the counter state reaches the value of a parameter that serves to set the locating signal. Through the use of two parameter values, through which the pulse duty ratios is set, different spectra can be set.

In a further embodiment of the invention, the transponder can terminate the transmission of the locating signal when a predefinable maximum time has elapsed and/or the transponder receives a command, to make it possible to detect additional transponders in the TTF-operating mode. After a certain time period, the probability that the transponder has been located is high. Consequently, it makes sense for the transponder to terminate transmission of the signal so that other transponders can be located. After locating has been completed, the transponder can also be muted with the aid of a command provided specially for this purpose, in order to allow additional transponders to be located.

In a further embodiment of the invention, the transponder can be located by an additional base station. The additional base station can be situated in a robot, for example, which serves to grip the transponder or the goods identified with the transponder. The additional base station need only have limited functions, which suffice to find the transponder using the locating signal.

In a further embodiment, the frequency of the carrier signal can be in the UHF frequency range.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
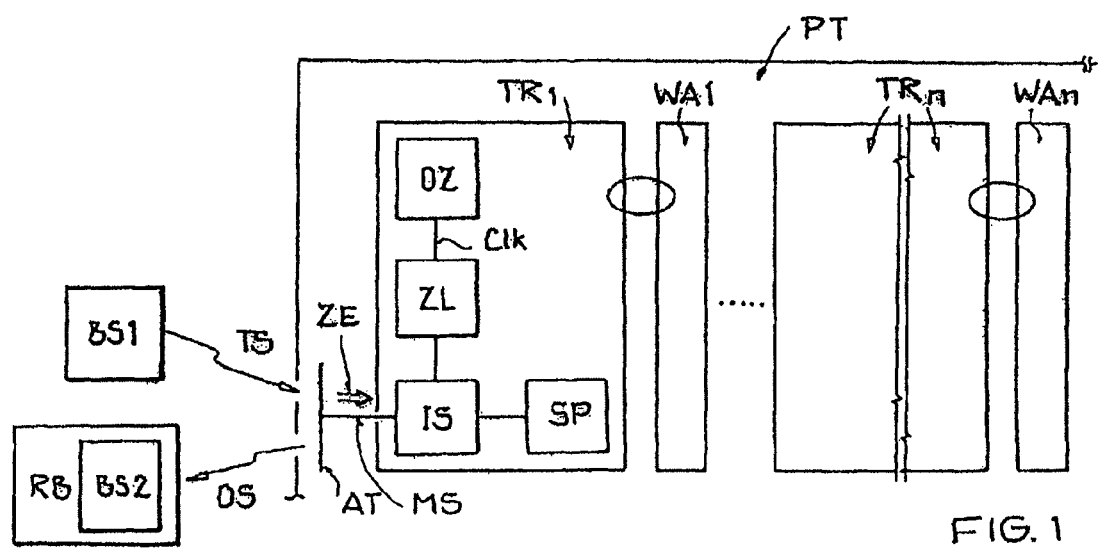
FIG. 1 a transponder-based pick-and-place application.

FIG. 1 shows a transponder-based pick-and-place application, which may be used in an inventory management system, for example. The application shown includes a first base station BS1, a robot RB that includes a second base station BS2, and a pallet PT upon which are arranged multiple goods WA1 through WAn, each of which is marked with its associated passive backscatter-based transponder TR1 through TRn.

The transponders TR1 through TRn each include a memory SP, an oscillator OZ, a counter ZL, an impedance control device IS, and an antenna AT.

The base station BS1 emits a carrier signal TS in the UHF range that serves to supply the transponders TR1 through TRn and is backscattered as a locating signal OS with phase modulation as soon as the transponder is in a transmit/receive range of the base station BS1.

Figure 2:
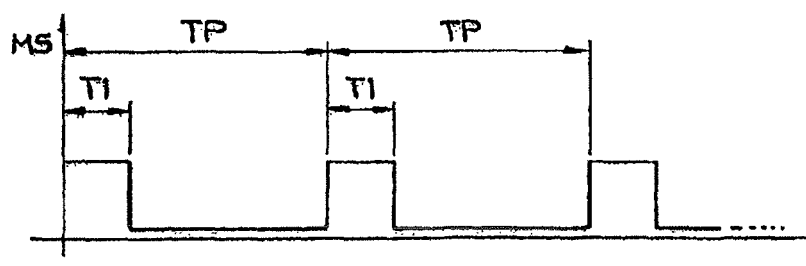
FIG. 2 a diagram of the time behavior of a modulation signal for modulating a carrier signal transmitted by a base station.

FIG. 2 shows a diagram of a time behavior of a modulation signal MS generated in the applicable transponder TR1 to TRn for modulating the carrier signal TS transmitted by the base station BS in order to produce the locating signal OS. The modulating signal MS has a period TP, an on-duration T1 and an off-duration TP-T1. A frequency and a duty cycle of the modulation signal MS can be calculated simply from the periods TP and T1. The modulation signal MS is a so-called subcarrier.

In order to set the periods T1 and TP, the memory SP contains parameters in the form of counter values, which are used for comparison with a counter state of the counter ZL. The memory may already be initialized when the transponder TR1 is manufactured, or appropriate parameter values may be contained in a locating command or another command, which values are then stored in the memory SP. If a 50/50 duty cycle is implemented, just one counter value can be stored or used. The counter ZL is incremented by a clock signal CLK of the oscillator OZ. The counter ZL is 8 bits wide, for example, so that it overflows after 256 clock cycles. The impedance control device IS, which is coupled to the memory SP and to the counter ZL, compares the counter state of the counter ZL with the stored counter values, and changes the state of the modulation signal MS each time the counter state matches a counter value. A change in the state of the modulation signal MS is associated with a change, in particular of the imaginary portion, in a complex input impedance ZE of the transponder TR1, which effects a phase change and hence a phase modulation of the backscattered signal, or of the locating signal OS. The impedance change in this context takes place in such a manner that essentially no amplitude change takes place in the signal backscattered and received by the transponder TR1. This ensures that generation of the locating signal OS by the transponder TR1 does not produce notches in an RSSI circuit of the transponder TR1. Consequently, the transponder TR1 remains ready to receive even during transmission of the locating signal OS.

Figure 3:
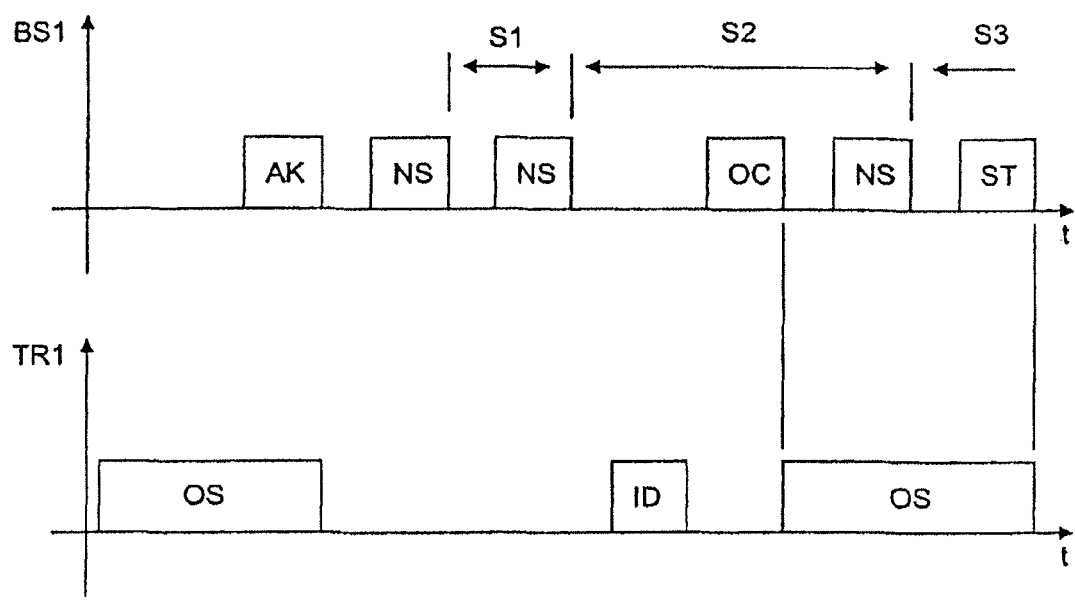
FIG. 3 a diagram of the time behavior of a locating process.

FIG. 3 shows a diagram of the time behavior of a locating process in which the transponder TR1 is located by the second base station BS2, picked out or singled out from the pallet PT by the robot RB, and then placed in a defined location. Naturally, the locating may also be performed by the base station BS1.

When the pallet PT, delivered by a freight forwarder, for example, reaches a response area of the base station BS1 or BS2, the base station BS1 or BS2 generally does not know what goods or what transponders TR1 through TRn are present on the pallet PT.

As soon as one of the transponders TR1 to TRn enters the range of communication of the base station BS1, that is, when the carrier signal TS for supplying the corresponding transponders TR1 to TRn with operating power, it transmits the locating signal OS. In the illustrated embodiment, all transponders TR1 to TRn virtually enter the communication zone of the base station BS1 simultaneously with the result that they all start transmitting their respective locating signals OS at the same time, that is, the respective locating signals OS superimpose.

The base station receives the superimposed locating signals OS, and by doing an analysis in a time domain, recognizes that superimposed signals are present. From that it can conclude that several transponders TR1 to TRn simultaneously entered its communication zone. If the respective locating signals of the transponders TR1 to TRn differ in their characteristics, for example, in their respective parameters T1 and TP, the locating of a specific transponder TR1 to TRn can be done by the specific characteristics of the generated locating signal OS. If the locating signals OS do not differ at all or only insignificantly, a selection procedure is first carried out to locate a specific transponder TR1 to TRn, whereby the transponder to be located, which is the transponder TR1 in the illustrated embodiment, is selected.

To select the transponder TR1, the base station BS1 carries out a slot-based ALOHA selection procedure. However, other conventional selection methods are also suited for the selection. After initiating the selection procedure, for example, by sending an appropriate command from the base station BS to the transponders TR1 to TRn, the respective transponders TR1 to TRn cease sending their locating signals OS. To locate individual, that is, selected transponders, a command is sent to the individual transponder by the base station with the result that it starts sending its locating signal OS once again. This process is described in more detail therebelow.

At the start of the selection process, the base station BS1 transmits a selection command AK to the transponders TR1 through TRn. After the receipt of the selection command AK in the tranponders TR1 to TRn, the respective transponders discontinue the transmission of their location signal OS. Thereafter, each of the transponders TR1 through TRn then internally generates a random number, which determines the slot in which that particular transponder TR1 through TRn backscatters its identification.

The base station BS1 now transmits a command NS, which indicates the start of a first time slot S1. Since none of the transponders TR1 through TRn has a random number associated with the first time slot S1, no identification is backscattered during this time slot. After a certain waiting period, the base station BS1 again transmits a command NS, which indicates the start of a second time slot S2. The transponder TR1 has a random number associated with the second time slot S2. Consequently, it backscatters its identification ID to the base station BS1. As a result of the bit coding, the base station BS1 can detect that no collision has taken place in the time slot S2, or in other words that only one transponder has backscattered its identification.

The base station BS1 now transmits a locating command OC to the transponder TR1, to make locating the transponder possible. After the transponder TR1 receives the locating command OC, it transmits a locating signal OS, which is generated through phase modulation and backscattering of the carrier signal TS transmitted from the base station BS1. After receiving the locating command OC, the transponder TR1 switches into what is known as a persistent operating state. If no locating command OC is transmitted, a switch to the persistent operating state does not take place, and upon receiving an additional command NS or a command initiating a new selection process, the selected transponder switches into a sleep or mute operating state during which it neither participates in a selection process nor generates a locating signal OS. In the persistent operating state, in contrast, the transponder TR1 transmits its locating signal OS until a maximum time period has elapsed or until it has received a specific command to switch off its locating signal OS.

The robot RB locates the transponder TR1 using the locating signal OS and the assistance of the base station BS2 by making a movement toward increasing field strength of the locating signal OS. Once the transponder TR1 has been located, it is gripped by the robot RB and placed in a specific location (not shown).

During the further course of the locating process, the base station BS1 transmits another command NS, which indicates the start of a third time slot S3. Since the transponder has already been located at this time, the base station BS1 transmits a command ST to the transponder TR1, whereupon said transponder stops sending the locating signal OS.

The embodiment shown provides a simple and economical-to-implement method for locating backscatter-based transponders in which the transponder or transponders transmit a locating signal and the transponders are able to receive data while they are transmitting the locating signal.

The described embodiment has a transponder-based pick-and-place application. It goes without saying that the method for locating backscatter-based transponders can be also used for theft protection applications, for example. In this instance, for example, it can be detected with the locating signal that is automatically generated by the transponder when merchandise marked with the transponder enters the communication zone, that is, the electromagnetic field of a base station, which can be positioned in the exit area of a warehouse, for example. Triggered by the received locating signal, the base station can read a memory area of the transponder, the contents of which indicates whether or not the merchandise had been previously paid for at a cash register. If the merchandise had not been paid for, the base station can trigger a theft warning signal.

A further field of application is in inventory administration systems. In this application, the transponder, which marks a product, can be configured by commands from a base station such that in a first configuration mode it does not generate a locating signal when it gets within the range of a base station. In contrast thereto, however, in a second configuration mode, it automatically generates the locating signal as soon as it gets within the range of a base station, that is, it carries out the locating method of the present invention. The second configuration mode can be activated, for example, when the transponder, that is, the merchandise marked by it, is delivered to a predetermined warehouse for final processing, that is, for delivery to the end user. When the product is properly put on a pallet and prepared for shipping to an end user, for example, the transponder is put, contactless, into a first configuration mode by a base station and as a consequence, can pass a control station, which is provided with a base station, without delay because the transponder does not automatically generate the locating signal in the communication zone of this base station. If the merchandise is not yet ready for shipping, that is, the transponder is still in the second configuration mode, and it passes through the control station, the transponder automatically generates the locating signal. Based on the locating signal, it can be ascertained that merchandise not ready for shipping yet is shipped by mistake due to an error in the warehouse operation.

Furthermore, the locating method of the present invention can be applied in the field of so-called self-driven systems. Obstacles for automatically controlled vehicles, for example, pallets, are thereby provided with transponders, which carry out the locating method of the present invention. The self-driven vehicle is provided with one or several base stations. As soon as the self-driven vehicle enters the area of a pallet with one or more transponders attached, the transponder, or transponders, automatically transmit their locating signals. Thus, the self-driving vehicle can automatically circumvent the obstacle.

If the locating signals generated by the transponders have different subcarrier frequencies, for example, a simple guiding system can be built in this way. The vehicle hereby moves along a first guiding beam with a first frequency to a first transponder, which emits this guiding beam, that is, this locating signal. In accordance therewith, the vehicle can move on its own to further transponders, which emit signals with a defined frequency.

Also, the base stations can be radio telephony devices, such as, for example, mobile handheld cellular devices. In addition, the transponders can be fixedly attached or integrated into objects.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method comprising:
   receiving, by a transponder, a locating command for locating the transponder;
   in response to receiving the locating command, transmitting, by the transponder, in a persistent operating state, a locating signal for locating the transponder;
   comparing, by an impedance control device coupled to a memory and a counter, a counter state of the counter with a counter value stored in the memory;
   in response to determining that the counter state matches the stored counter value, changing, by the impedance control device, a state of a modulation signal, such that a phase of the locating signal is changed;
   in the persistent operating state, receiving, by the transponder, a switch-off command while simultaneously transmitting, without an interruption for receiving the switch-off command, the locating signal; and
   discontinuing transmission of the locating signal in response to one or more of:
     receiving the switch-off command; and
     an expiration of a pre-determined period of time.

2. The method of claim 1, further comprising:
   receiving, by the transponder, an unmodulated carrier signal from a base station; and
   transmitting a first locating signal in response to the transponder moving within range of a communication zone of the base station based on a field strength of the received carrier signal.

3. The method of claim 2, further comprising discontinuing, in response to receiving a first selection command, transmission of the first locating signal, the first selection command being different from the locating command and received before the transponder receives the locating command.

4. The method of claim 3, wherein the first selection command is received in response to the base station receiving a locating signal from at least one additional transponder.

5. The method of claim 3, further comprising:
receiving a second selection command indicative of a start time slot associated with the transponder; and
transmitting an identification signal associated with the transponder.

6. The method of claim 5, wherein the locating command was in response to the base station receiving the identification signal transmitted from the transponder.

7. The method of claim 1, wherein the switch-off command is associated with a start time for a second transponder.

8. The method of claim 1, wherein the change in the state of the modulation signal is associated with an impedance change of the transponder, the impedance change occurring such that the locating signal experiences essentially no amplitude change as a result of the impedance change.

9. The method of claim 1, wherein the transponder is configured to generate the locating signal without producing notches in a receiver signal strength indicator (RSSI) circuit of the transponder, such that the transponder remains ready to receive the switch-off command during transmission of the locating signal.

10. An apparatus comprising:
means for receiving a locating command for locating a transponder;
means for transmitting, in a persistent operating state, a locating signal for locating the transponder in response to receiving the locating command, comparing, by an impedance control device coupled to a memory and a counter, a counter state of the counter with a counter value stored in the memory, in response to determining that the counter state matches the stored counter value, changing, by the impedance control device, a state of a modulation signal, such that a phase of the locating signal is changed, and, in the persistent operating state, receiving a switch-off command while simultaneously transmitting, without an interruption for receiving the switch-off command, the locating signal; and
means for discontinuing transmission of the locating signal in response to one or more of:
receiving the switch-off command; and
an expiration of a pre-determined period of time.

11. The apparatus of claim 10, further comprising:
means for receiving an unmodulated carrier signal from a base station; and
means for transmitting a first locating signal in response to moving within range of a communication zone of the base station based on a field strength of the received carrier signal, the first locating signal generated through phase modulation and backscattering of the received unmodulated carrier signal sent by the base station.

12. The apparatus of claim 11, further comprising means for discontinuing, in response to receiving a first selection command, transmission of the first locating signal, the first selection command being different from the locating command and received before the transponder receives the locating command.

13. The apparatus of claim 12, wherein the first selection command is received in response to the base station receiving a locating signal.

14. The apparatus of claim 12, further comprising:
means for receiving a second selection command indicative of a start time slot; and
means for transmitting an identification signal.

15. The apparatus of claim 14, wherein the locating command was received in response to the base station receiving the identification signal transmitted from the transponder.

16. The apparatus of claim 10, wherein the change in the state of the modulation signal is associated with an impedance change of the transponder, the impedance change occurring such that the locating signal experiences essentially no amplitude change as a result of the impedance change.

17. An apparatus comprising:
a memory; and
circuitry configured to perform operations comprising:
receiving, by a transponder, a locating command for locating the transponder;
in response to receiving the locating command, transmitting, in a persistent operating state, a locating signal for locating the transponder;
comparing, by an impedance control device coupled to the memory and a counter, a counter state of the counter with a counter value stored in the memory;
in response to determining that the counter state matches the stored counter value, changing, by the impedance control device, a state of a modulation signal, such that a phase of the locating signal is changed;
in the persistent operating state, receiving, by the transponder, a switch-off command while simultaneously transmitting, without an interruption for receiving the switch-off command, the locating signal; and
discontinuing transmission of the locating signal in response to one or more of:
receiving the switch-off command; and
an expiration of a pre-determined period of time.

18. The apparatus of claim 17, wherein the circuitry is further configured to perform operations comprising:
receiving, by the transponder an unmodulated carrier signal from a base station; and
transmitting a first locating signal in response to the transponder moving within range of a communication zone of the base station based on a field strength of the received carrier signal, the first locating signal generated through phase modulation and backscattering of the received unmodulated carrier signal sent by the base station.

19. The apparatus of claim 18, wherein the circuitry is further configured to perform operations comprising discontinuing, in response to receiving a first selection command, transmission of the first locating signal, the first selection command being different from the locating command and received before the transponder receives the locating command.

20. The apparatus of claim 19, wherein the first selection command is received in response to the base station receiving a locating signal from at least one additional transponder.

21. The apparatus of claim 19, wherein the circuitry is further configured to perform operations comprising:
receiving a second selection command indicative of a start time slot associated with the transponder; and
transmitting an identification signal associated with the transponder.

22. The apparatus of claim 21, wherein the locating command was received in response to the base station receiving the identification signal transmitted from the transponder.

23. The apparatus of claim 22, wherein the switch-off command is associated with a start time for a second transponder.

24. The apparatus of claim 17, wherein the change in the state of the modulation signal is associated with an impedance change of the transponder, the impedance change occurring such that the locating signal experiences essentially no amplitude change as a result of the impedance change.

\* \* \* \* \*